(12) United States Patent
Zhang et al.

(10) Patent No.: US 10,586,168 B2
(45) Date of Patent: Mar. 10, 2020

(54) DEEP TRANSLATIONS

(71) Applicant: Facebook, Inc., Menlo Park, CA (US)

(72) Inventors: Ying Zhang, Turlock, CA (US); Fei Huang, Boonton, NY (US); Feng Liang, Sunnyvale, CA (US)

(73) Assignee: FACEBOOK, INC., Menlo Park, CA (US)

( * ) Notice: Subject to any disclaimer, the term of this patent is extended or adjusted under 35 U.S.C. 154(b) by 1059 days.

(21) Appl. No.: 14/878,762

(22) Filed: Oct. 8, 2015

(65) Prior Publication Data

US 2017/0103338 A1    Apr. 13, 2017

(51) Int. Cl.
    *G06N 20/00*     (2019.01)
(52) U.S. Cl.
    CPC .................... *G06N 20/00* (2019.01)
(58) Field of Classification Search
    CPC ........ G06F 17/30; G06F 17/2845; G06F 7/00; G06F 17/00; G06F 17/27; G06F 17/2785; G06N 99/005; G06N 20/00; G06N 3/08; H04L 29/06
    See application file for complete search history.

(56) References Cited

U.S. PATENT DOCUMENTS

| | | | |
|---|---|---|---|
| 4,797,855 A | 1/1989 | Duncan et al. | |
| 5,839,106 A | 11/1998 | Bellegarda | |
| 6,470,362 B1 | 10/2002 | Eustace et al. | |
| 6,714,905 B1 | 3/2004 | Chang et al. | |
| 6,721,697 B1 | 4/2004 | Duan et al. | |
| 7,028,038 B1 | 4/2006 | Pakhomov | |
| 7,203,635 B2 | 4/2007 | Oliver et al. | |
| 7,440,941 B1 | 10/2008 | Borkovsky et al. | |
| 7,529,657 B2 | 5/2009 | Wang et al. | |
| 7,593,843 B2 | 9/2009 | Aue et al. | |
| 7,865,358 B2 | 1/2011 | Green et al. | |
| 7,912,717 B1 | 3/2011 | Galick et al. | |
| 8,069,027 B2 | 11/2011 | Liu et al. | |
| 8,135,576 B2 | 3/2012 | Haley et al. | |

(Continued)

OTHER PUBLICATIONS

'Elements of artificial neural networks': Mehrotra, 1997, MIT press.*

(Continued)

*Primary Examiner* — Li B. Zhen
*Assistant Examiner* — Peter D Coughlan (57) ABSTRACT

The described technology can provide semantic translations of a selected language snippet. This can be accomplished by mapping snippets for output languages into a vector space; creating predicates that can map new snippets into that vector space; and, when a new snippet is received, generating and matching a vector representing that new snippet to the closest vector for a snippet of a desired output language, which is used as the translation of the new snippet. The procedure for mapping new snippets into the vector space can include creating a dependency structure for the new snippet and computing a vector for each dependency structure node. The vector computed for the root node of the dependency structure is the vector representing the new snippet. A similar process is used to train a transformation function for each possible node type, using language snippets already associated with a dependency structure and corresponding vectors.

20 Claims, 8 Drawing Sheets

(56) References Cited

U.S. PATENT DOCUMENTS

| | | | |
|---|---|---|---|
| 8,442,940 B1 | 5/2013 | Stockley et al. | |
| 8,700,384 B1 | 4/2014 | Lattyak | |
| 9,070,360 B2 | 6/2015 | Yu et al. | |
| 9,990,361 B2* | 6/2018 | Zhang | G06F 17/2809 |
| 2001/0014902 A1* | 8/2001 | Hu | G06F 17/2785 |
| | | | 715/236 |
| 2002/0040292 A1 | 4/2002 | Marcu et al. | |
| 2003/0105638 A1 | 6/2003 | Taira et al. | |
| 2005/0240439 A1 | 10/2005 | Covit et al. | |
| 2006/0015317 A1 | 1/2006 | Nakagawa et al. | |
| 2006/0277029 A1 | 12/2006 | Green et al. | |
| 2008/0270120 A1 | 10/2008 | Pestian et al. | |
| 2009/0089046 A1 | 4/2009 | Uchimoto et al. | |
| 2009/0119095 A1 | 5/2009 | Beggelman et al. | |
| 2009/0228299 A1 | 9/2009 | Kangarloo et al. | |
| 2010/0299132 A1 | 11/2010 | Dolan et al. | |
| 2010/0306249 A1 | 12/2010 | Hill et al. | |
| 2012/0239378 A1 | 9/2012 | Parfentieva et al. | |
| 2013/0138696 A1* | 5/2013 | Turdakov | G06F 17/30734 |
| | | | 707/794 |
| 2014/0156733 A1* | 6/2014 | Goranson | G06F 17/30899 |
| | | | 709/203 |
| 2015/0032443 A1 | 1/2015 | Shilon et al. | |
| 2015/0088484 A1* | 3/2015 | Bostick | G06F 17/2785 |
| | | | 704/2 |
| 2017/0039181 A1 | 2/2017 | Karov et al. | |
| 2017/0103062 A1 | 4/2017 | Zhang et al. | |

OTHER PUBLICATIONS

Non-Final Office Action dated Oct. 5, 2017, for U.S. Appl. No. 14/878,794 of Zhang, Y., filed Oct. 8, 2015.

Final Office Action dated May 19, 2017, for U.S. Appl. No. 14/878,794 by Zhang, Y. filed Oct. 8, 2015.

Non-Final Office Action dated Oct. 7, 2016, U.S. Appl. No. 14/878,794 of Zhang, Y. filed Oct. 8, 2015.

Sutskever, I., et al., "Sequence to sequence learning with neural networks," Advances in Neural Information Processing Systems, pp. 3104-3112, 2014.

U.S. Appl. No. 14/878,794 by Zhang, Y., et al., filed Oct. 8, 2015.

Advisory Action dated Aug. 18, 2017 for U.S. Appl. No. 14/878,794 by Zhang, Y. filed Oct. 8, 2015.

* cited by examiner

DEEP TRANSLATIONS

BACKGROUND

The Internet has made it possible for people to connect and share information across the globe in ways previously undreamt of. Social media platforms, for example, enable people on opposite sides of the world to collaborate on ideas, discuss current events, or just share what they had for lunch. In the past, this spectacular resource has been somewhat limited to communications between users having a common natural language ("language"). In addition, users have only been able to consume content that is in their language, or for which a content provider is able to determine an appropriate translation.

While communication across the many different languages used around the world is a particular challenge, several machine translation engines have attempted to address this concern. Machine translation engines enable a user to select or provide a content item (e.g., a message from an acquaintance) and quickly receive a translation of the content item. However, content items can be inaccurately translated due to translation rules that do not account for the semantics of the content item being translated. For example, variants of the same language (e.g., American English versus British English), different meanings of the same word or phrase, non-standard phrases (e.g., slang), etc., can result in machine translation inaccuracies. For example, the word "lift" can mean "move upward" among speakers of American English (as that word is commonly used in America), whereas it can mean "elevator" for British English speakers. A content item including the phrase, "press the button for the lift," could be translated into either "press the button for the elevator" or "press the button to go up." In addition, machine translations of a content item are often based on dictionary translations and do not consider context, which often makes a significant difference such as in slang or colloquial passages.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

A semantic language processing system is disclosed that can transform a selected language snippet into an output in an alternate domain, such as a translation of the selected language snippet, a correction for the selected language snippet, or an automated response to the selected language snippet. As used herein, a "language snippet" or "snippet" is a digital representation of one or more words or groups of characters from a natural language. In some implementations, language snippets can be obtained from social network content items, such as posts. The semantic language processing system can perform this transformation for an input snippet into an output domain by: (A) converting the input snippet into a dependency structure; (B) using a trained vector space predicate to compute an input vector that semantically represents the input snippet; (C) mapping the input vector into a vector space that includes output vectors corresponding to snippets in the output domain; (D) selecting an output vector most similar to the input vector; and (E) providing an output snippet corresponding to the output vector as the transformation in the output domain. Additional details regarding applying vector space predicates and a vector space to obtain a domain transformation of a selected snippet are provided below in relation to FIG. 7 and FIG. 8.

The semantic language processing system can convert an input snippet into a dependency structure by dividing the input snippet into groups of one or more words, with each word group set as a leaf node in the dependency structure. "Words," as used herein, can be traditional words, i.e. characters separated by whitespace or punctuation, or can be other character groupings, such as a specified number of characters. The semantic language processing system can then identify relationships between word groups. Based on these relationships, word groups can be combined to create intermediate nodes in the dependency structure. When all the word groups have been combined into a single node, this node is the root node of the dependency structure. For example, if the input snippet is "A fast car," the word group "fast" has a modifier relationship with word group "car." Thus, the leaf nodes corresponding to "fast" and "car" can be combined into the intermediate node "fast car" which is associated with a type "modifier." The word group "A" has a "singular article" relationship with the word group "fast car." Thus the leaf node corresponding to "A" and the intermediate node corresponding to "fast car" can be combined into the root node "A fast car" which is associated with a type "singular article." Additional details regarding converting an input snippet into a dependency structure are provided below in relation to FIG. 4 and FIG. 5.

A trained vector space predicate can include a vector transformation function configured to generate an output vector based on two or more input vectors related to a particular relationship type between the input vectors. The semantic language processing system can generate or "train" such a vector transformation function for a relationship type by obtaining vector space predicate training data comprising output vectors, each paired with one or more input vectors related according to the relationship type. An untrained vector space predicate, such as a neural network with random or neutral node weights, can be obtained and trained with the obtained vector space predicate training data. The semantic language processing system can accomplish this training by providing the one or more input vectors as input to the untrained vector space predicate and comparing the output of the untrained vector space predicate to the output vector paired with those input vectors. The vector space predicate can then be modified based on the comparison, such as by modifying node weights in the neural network. After one or more iterations of applying this training data, the vector space predicate can be trained to receive input vectors for which an output vector is not known, and generate a corresponding output vector. Additional details regarding generating vector space predicates using vector space predicate training data are provided below in relation to FIG. 6.

The semantic language processing system can train a vector space predicate for each type of vector relationship that exists in a given output domain. The semantic language processing system can also train a set of vector space predicates for each of multiple domains. A large corpus of snippets in an identified domain, such as posts to a social media website in an identified natural language, can then be converted into dependency structures, and vector space predicates for the domain of the identified language can be used to map the snippets into a vector space for the domain of the identified natural language.

The semantic language processing system can convert a received snippet into vector space predicate training data by building a dependency structure for the received snippet. The semantic language processing system can then, for each of multiple nodes of the dependency structure, compute an output vector representing that node and storing a grouping corresponding to the node comprising: the output vector for the node, one or more input vectors used to obtain the output vector; and a node-type indicating a relationship between the input vectors used to obtain the output vector. Additional details regarding obtaining vector space predicate training data are provided below in relation to FIG. 4.

The semantic language processing system can improve snippet domain transformations such as translations, corrections, and automated responses because, instead of trying to implement rules and algorithms to generate a new output snippet for a specified input snippet, the semantic language processing system can match the input snippet to an appropriate output snippet that has been previously created, such as by a human. Such output snippets would not suffer many of the drawbacks found in rule-based transformations, such as, ambiguities due to homonyms or slang in traditional machine translations. By generating a semantic representation of the input snippet, the semantic language processing system can perform this matching for a wide variety of input snippets without requiring an exact input/output match.

Figure 1:
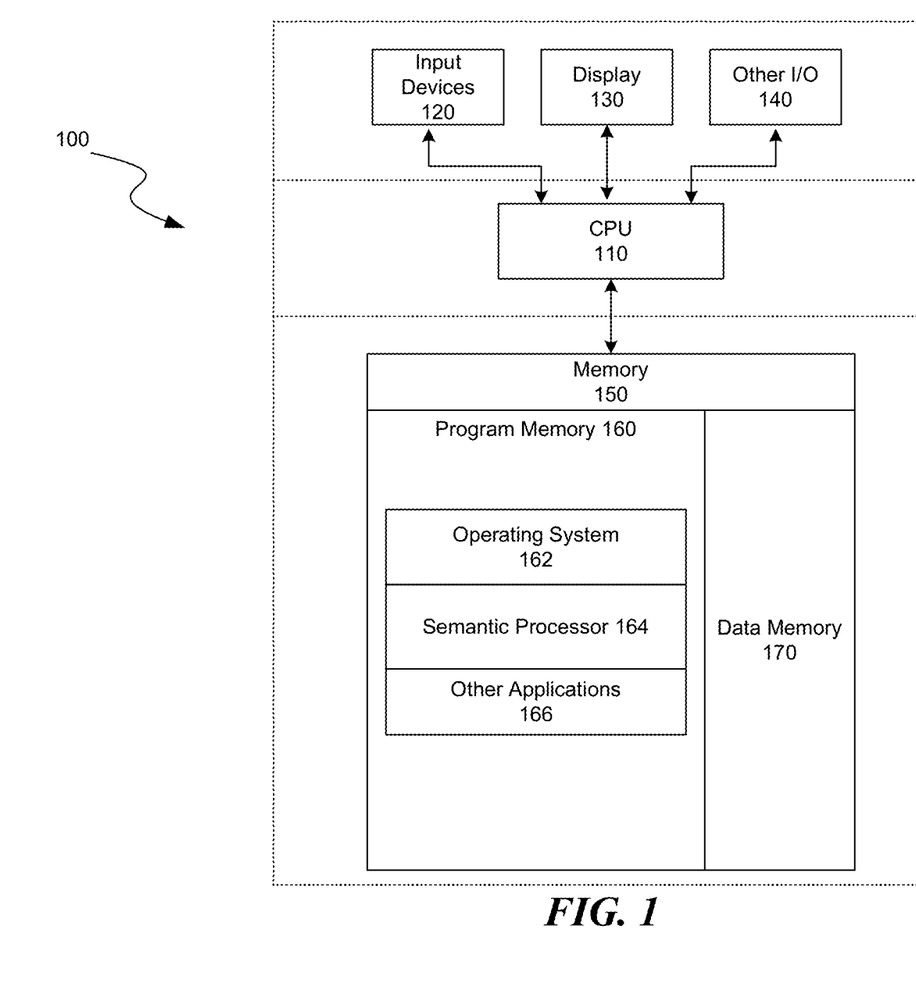
FIG. 1 is a block diagram illustrating an overview of devices on which some implementations of the disclosed technology can operate.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that performs semantic language processing. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, semantic processor 164, and any other application programs 166. Memory 150 also includes data memory 170 that can include dependency structures, semantic vectors, vector space predicates, virtual spaces, snippets, vector space predicate training data, threshold values, loaded algorithm code for building and manipulating these structures, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
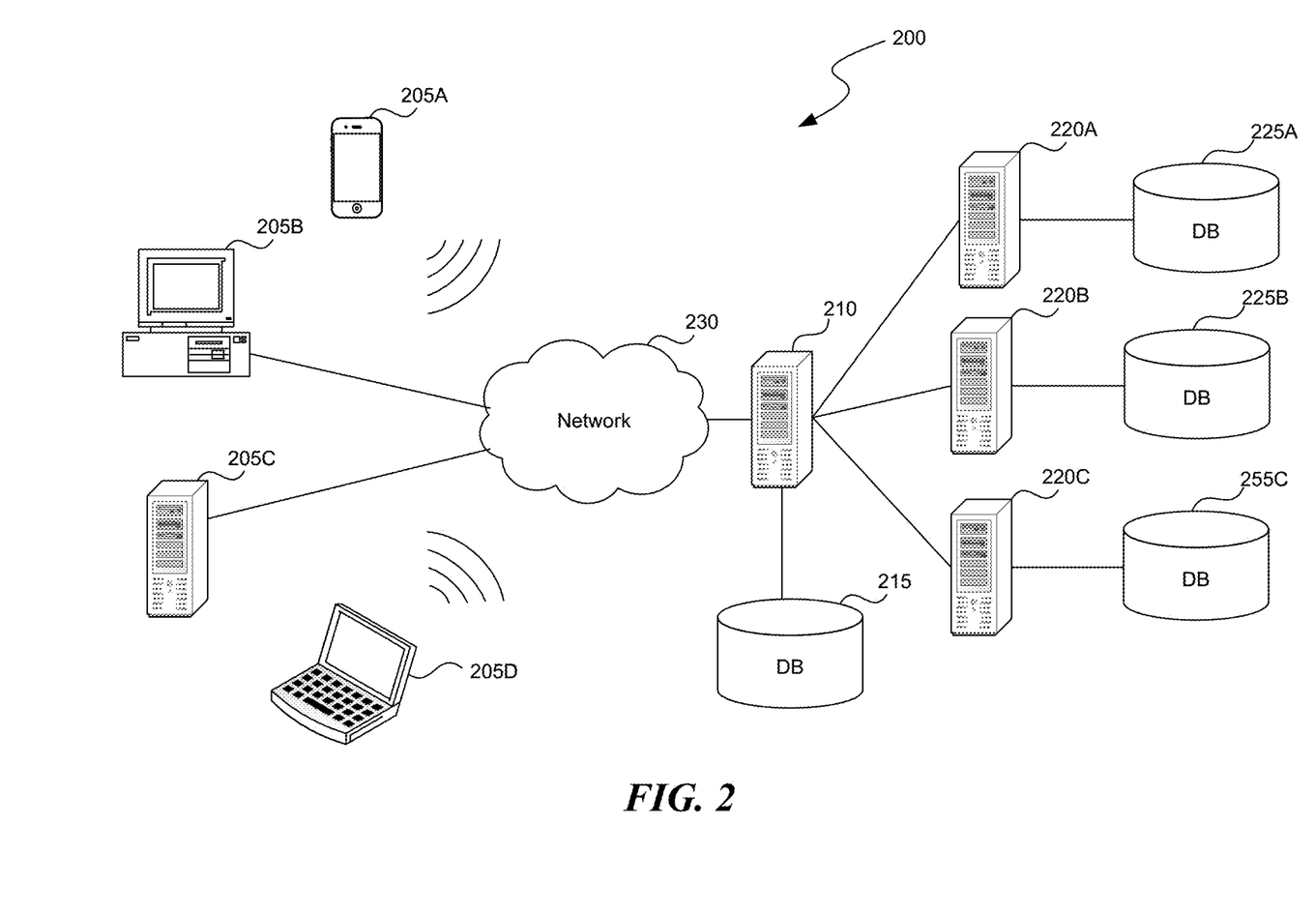
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as snippets, dependency structures, semantic vectors, vector space predicates, vector space predicate training data, and virtual spaces. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
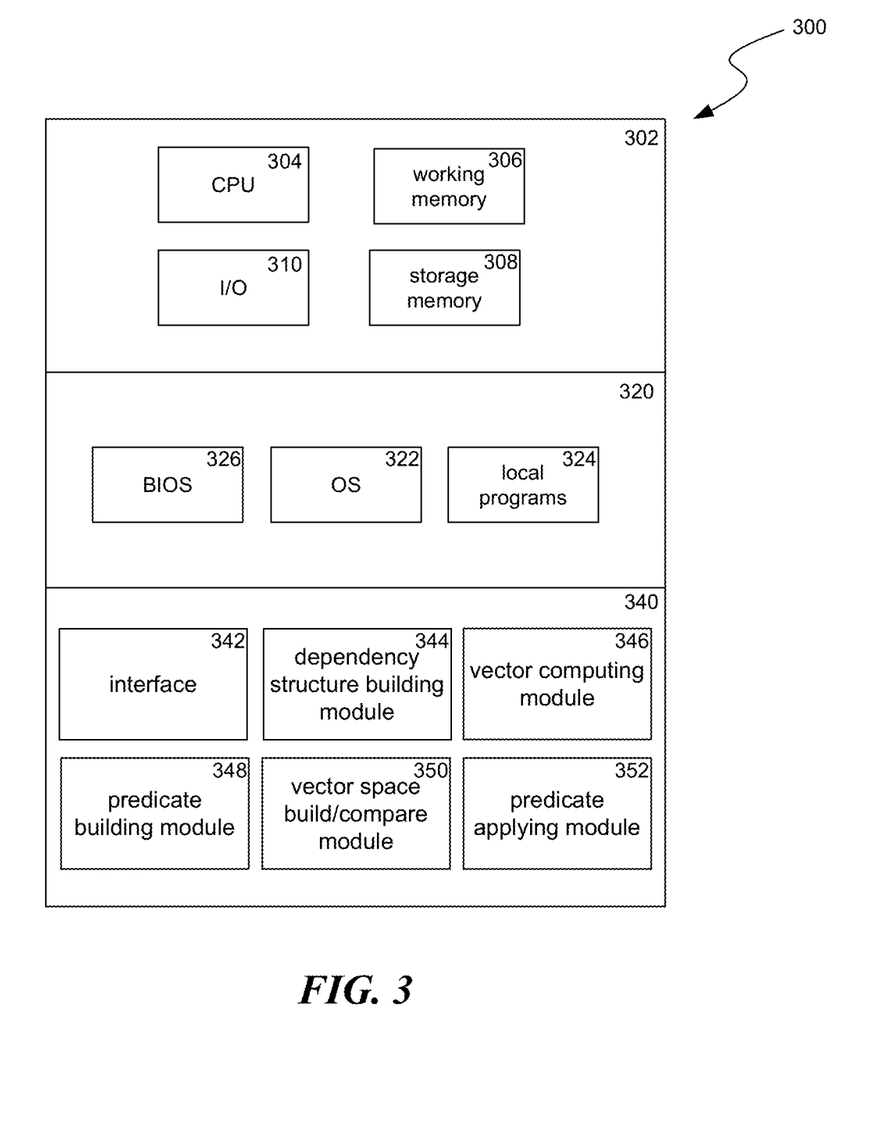
FIG. 3 is a block diagram illustrating components which, in some implementations, can be used in a system employing the disclosed technology.

FIG. 3 is a block diagram illustrating components 300 which, in some implementations, can be used in a system implementing of the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include dependency structure building module 344, vector computing module 346, vector space predicate building module 348, vector space building and comparing module 350, vector space predicate applying module 352, and components which can be used for controlling and receiving data from the specialized components, such as interface 342. In some implementations, components 300 can be in a computing system that is distributed across multiple computing devices or can include an interface to a server-based application.

Dependency structure building module 344 can build a dependency structure corresponding to a language snippet. A dependency structure can be an inverted tree structure built by identifying leaf nodes at a lowest level and progressively adding intermediate nodes based on a combination of two or more lower level nodes until a root node is added that is a combination including all the leaf nodes. In some implementations, unlike traditional tree structures, higher level nodes in the inverted tree structure can result from nodes in two or more different lower levels. Dependency structure building module 344 can create dependency structures by dividing the snippet into one or more word groups, each comprising one or more words. Dependency structure building module 344 can add a leaf node to the dependency structure corresponding to each word group. Dependency structure building module 344 can then determine relationships between various of the word groups. In some implementations, relationship types can includes one or more of: modifier, noun phrase, determiner, verb phrase, having, doing, affection, position phrase, time phrase, quality phrase, quantity phrase, etc. In various implementations, the relationships can be between two word groups or three word groups. Dependency structure building module 344 can add a node representing a combination of nodes at a lower level. The added node can be connected by edges to the lower level nodes which the added node represents a combination of. Nodes can be added until a root node is added that represents a combination of all the word groups for the initial snippet. Each individual node in the dependency structure can be associated with (A) a snippet comprising the word groups associated with the lower level nodes the individual node is connected to and (B) the relationship identified between the word groups corresponding to the lower level nodes the individual node is connected to. An example of building a dependency structure is discussed below in relation to FIG. 5.

Vector computing module 346 can determine a vector for each node in a dependency structure, such as a dependency structure created by dependency structure building module 344. Vector computing module 346 can accomplish this by first obtaining a vector for each word group at the lowest (leaf) level of the dependency structure. For example, words in a language or some defined word groups can have pre-defined vectors. Vector computing module 346 can then compute a vector for each selected node, a next lowest level by combining the vectors from lower level nodes that have edges connected to that selected node. The combination of vectors from lower level nodes that have edges connected to that selected node can be based on the relationship associated with that selected node that was identified between the vectors from lower level nodes that have edges connected to that selected node. In some implementations, vector computing module 346 can accomplish these combinations using a transformation function defined for each type of vector relationship. These transformation functions can be created from vector representations of relationships between neural network nodes to combine: vectors representing lower level words or word group and a vector representing a type for the words or word groups, such that combinations result in a vector representing the combined word or word group vectors. In some implementations, the combination of vectors is based on the relationship between the vectors from lower level nodes by virtue of the order of vector combination being determined according to the dependency structure. The resulting vectors computed by vector computing module 346 can be associated with their corresponding nodes. In some implementations, each selected node in the dependency structure can be associated with a vector grouping comprising: the vector representing the word grouping associated with the selected node (i.e. an "output vector,") the node-type associated with the selected node, and "parameter vectors" comprising the vectors associated with the lower level nodes used to create the vector associated with the selected node (i.e. "input vectors").

Vector space predicate building module 348 can obtain vector groupings that are all associated with dependency structure nodes that have the same node-type and can use them to train a vector space predicate for the vector relationship identified by that node-type. These vector groupings can be vector groupings associated with dependency structure nodes after vector computing module 346 has computed vectors corresponding to each node. Vector space predicate building module 348 can then use the vector groupings to train a vector space predicate. Vector space predicate building module 348 can train a vector space predicate by first obtaining a vector space predicate. The vector space predicate can be a machine learning structure, such as a neural network. The machine learning structure can be partially trained from applying previous vector groupings, or can be untrained with initial random or neutral values. Predicate building module 348 can then apply the parameter vectors from each grouping to compute a predicate vector.

After each set of parameter vectors is applied, vector space predicate building module 348 can compare a resulting predicate vector generated by the obtained vector space predicate to the output vector associated with that set of parameter vectors. In some implementations, this comparison can be the cosine distance between the predicate vector and the output vector. Based on the comparison, vector space predicate building module 348 can adjust the received vector space predicate. For example, where the vector space predicate comprises a neural network, the vector space predicate building module 348 can adjust the weights of one or more nodes within the neural network based on results of the comparison. After one or more iterations of applying vector groupings to the vector space predicate for the same relationship type and modifying the vector space predicate based on the results, the vector space predicate can accurately determine appropriate output vectors for parameter vectors that have that relationship type.

Vector space building and comparing module 350 can build a vector space, mapping vectors representing snippets in a specified domain into the vector space, and finding the closest matching vectors in a specified output domain. Vector space building and comparing module 350 can build a vector space by identifying a dimensional space as the vector space. In some implementations, this dimensional space can be a pre-defined coordinate system. Vector space building and comparing module 350 can map, into the vector space, vectors each representing a set of received snippets, or parts thereof, that are in a particular output domain. Vector space building and comparing module 350 can obtain these vectors for the snippets or snippet parts by building a dependency structure for each received snippet, such as by using dependency structure builder 344. Vector space building and comparing module 350 can then obtain vectors for each leaf node of the dependency structure as described above in relation to vector computing module 346.

Next, vector space building and comparing module 350 can compute vectors corresponding to each intermediate node in the dependency structure and the root node in the dependency structure by applying a vector space predicate corresponding to the type of each selected node, such as vector space predicates generated by vector space predicate building module 348, to the vectors corresponding to lower level nodes that have edges connected to that selected node. Vector space building and comparing module 350 can apply these vector space predicates using vector space predicate applying module 352, discussed below. In various implementations, vector space building and comparing module 350 maps only the vector corresponding to the root node of the dependency structure into the vector space; maps all the vector corresponding to non-leaf nodes of the dependency structure into the vector space; or maps all the vectors corresponding to nodes of the dependency structure into the vector space.

When a new snippet is received, such as through interface 342, that is to be transformed into a specified output domain, vector space building and comparing module 350 can use dependency structure building module 344 to build a dependency structure for the new snippet, can obtain vectors for the leaf nodes of this dependency structure, and can use predicate applying module 352 to iteratively obtain vectors for non-leaf level nodes until a vector for the root node of the dependency structure, i.e. a vector representing the whole of the new snippet, is obtained. Vector space building and comparing module 350 can then map the vector corresponding to the root node into a vector space. That vector space can have vectors mapped into it corresponding to snippets in the specified output domain. Vector space building and comparing module 350 can then find the vector representing a snippet in the output domain that is closest to the vector representing the new snippet. The snippet corresponding to this closest vector is identified as the transformed version of the new snippet. For example, a new snippet "I will never forget you!" can be received with an indicated output domain of Spanish. A dependency structure (nodes shown herein are denoted "snippet":nodeType) with leaf nodes corresponding to "I":word, "will":word, "never":word, "forget":word, and "you":word; a first level intermediate node corresponding to "forget you":subject, a second level intermediate node corresponding to "I forget you":object; a third level intermediate node corresponding to "I never forget you":negative; and a root node corresponding to "I will never forget you":predicative. A vector can be computed for each intermediate node and the root node using vector space predicates corresponding to each type. For example, the vector corresponding to the snippet "I forget you" can be determined by applying an object-type vector space predicate trained to build a vector using two vectors that have an object-type relationship. The vectors corresponding to the lower level nodes for the snippets "I" and "forget you" can be provided to this object-type vector space predicate. Once a vector is obtained for the root node, vector space building and comparing module 350 can map it into a vector space that includes vectors corresponding to Spanish snippets. The closest vector in the vector space that is for a Spanish snippet, in this example, corresponds to the snippet "Nunca to olvidaré" which is provided as the Spanish transformation of the provided new snippet.

In some implementations, a difference between the closest vector and the vector representing the new snippet must be below a threshold level for a match to be made. If a match is not made, an alternate method of transformation can be applied, such as if the transformation is a translation between natural languages, standard machine translation techniques can be used.

Vector space predicate applying module 352 can obtain vectors corresponding to intermediate and root dependency structure nodes. Vector space predicate applying module 352 can achieve this for a selected node by obtaining a vector space predicate, such as a vector space predicate built by vector space predicate building module 348, corresponding to the type of the selected node, and using the vectors of the nodes with a lower level than the selected node that have an edge connecting them to the selected node as input to the obtained vector space predicate. The result can be an output vector corresponding to the selected node.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
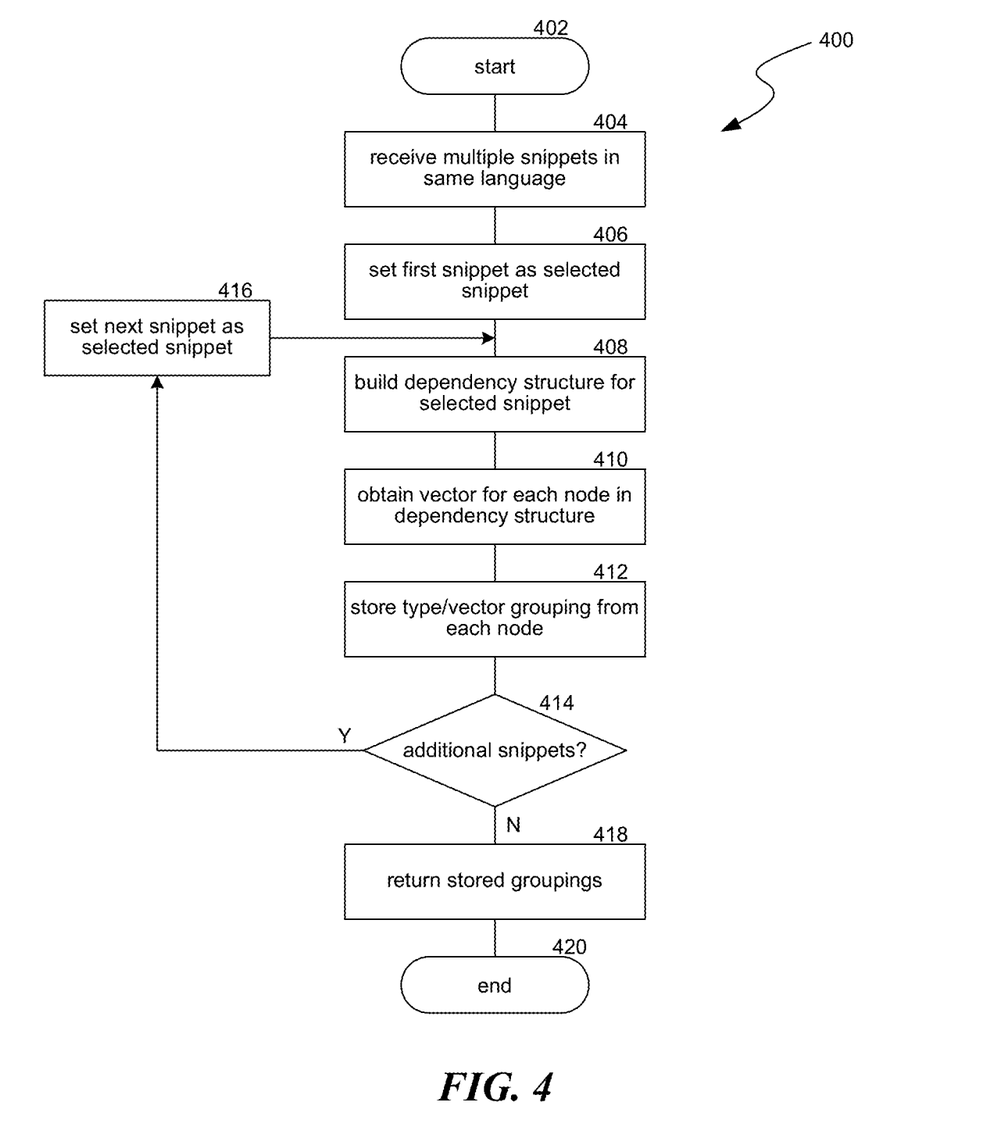
FIG. 4 is a flow diagram illustrating a process used in some implementations for obtaining vector space predicate training data.

FIG. 4 is a flow diagram illustrating a process 400 used in some implementations for obtaining vector space predicate training data. Process 400 begins at block 402 and continues to block 404. At block 404, process 400 can receive multiple snippets within the same domain. In some implementations, where the vector space predicate training data is for training language translation predicates, the domain can be a particular language. In some implementations, the received snippets can be selected to provide good language coverage, as described in greater detail in U.S. Pat. No. 9,588,966, entitled "Data Sorting for Language Processing Such as POS Tagging", which is incorporated herein by reference in its entirety. At block 406, a first snippet of the received multiple snippets is set as a selected snippet.

At block 408, process 400 can build a dependency structure for the selected snippet. In some implementations, a dependency structure can be an inverted tree structure, with: one or more leaf nodes each corresponding to one of the one or more words of the selected snippet; one or more intermediate nodes based on a combination of the word groups associated with one or more of: the one or more leaf nodes or one or more other intermediate nodes; and a root node based on a combination of the word groups associated with one or more of: the one or more leaf nodes or one or more of the intermediate nodes. Each individual non-leaf node has "parent nodes," which are the nodes associated with word groups that were combined to create the word group associated with that individual non-leaf node. Building a dependency structure can comprise: dividing the selected snippet into word groups; creating a leaf node corresponding to each word group, and iteratively—determining relationships between word groups of two or more nodes, referred to as combine nodes, that have not been combined with any higher level node, and creating a new node at a level one level higher than the highest level combine node. These iterations can be repeated until a root node is added, which is a node representing a word group comprising all the words of the selected snippet. An example of building a dependency structure is illustrated below in FIG. 5.

At block 410, process 400 can obtain a vector corresponding to each node in the dependency structure created at block 408. Obtaining vectors for leaf-level nodes can comprise looking up pre-defined vectors for words or word groups or adding together pre-defined vectors for words in a word group. Process 400 can then progress up each level of the dependency structure and generate vectors for each individual node in that level by combining the vectors of the lower level nodes that have edges connected to that individual node, referred to as parameter vectors of the resulting vector for that individual node. In some implementations, this combination can account for a relationship between the word groups represented by the parameter vectors. For example, if a selected node corresponds to the word group "blue hat" and the word groups corresponding to the two parent nodes of the selected nodes are "blue" and "hat," the selected node would have the node-type "modifier" because "blue" is a modifier of "hat." A vector corresponding to "blue" can be obtained and a vector corresponding to "hat" can be obtained and a transformation function can be used that combines vectors that have a modifier relationship to obtain a vector representing the word group "blue hat." This vector can then be associated with the selected node.

At block 412, process 400 can store a vector grouping corresponding to each node in the dependency structure. A vector grouping for a selected node can include an indication of the node-type, an indication of the vector that represents the word group associated with the selected node, and indications of the parameter vectors used to create the vector that represents the word group associated with selected node. For leaf nodes, the vector grouping can be: (nodeType: "singleWord"; vector:vectorOfTheWord; parameterVectors: none). In some implementations, process 400 only stores the vector grouping corresponding to the non-leaf nodes of the dependency structure. In some implementations, process 400 only stores the vector grouping corresponding to the root node of the dependency structure.

At block 414, process 400 can determine whether there are any additional snippets in the set of snippets received at block 404 that have not been operated on by the loop between blocks 408-416. If so, process 400 continues to block 416, where the next snippet in the set of snippets received at block 404 can be set as the selected snippet, which will then be operated on by the loop between blocks 408-416. If not, process 400 continues to block 418, where process 400 can return indications of the vector groupings that were stored at block 412. These vector groupings can be used as training data for a vector space predicate, as discussed below in relation to FIG. 6. In various implementations, process 400 returns indications of all the vector groupings, only indications vector groupings corresponding to non-leaf nodes, or indications of vector groupings corresponding to root nodes. Process 400 then continues to block 420, where it ends.

Figure 5:
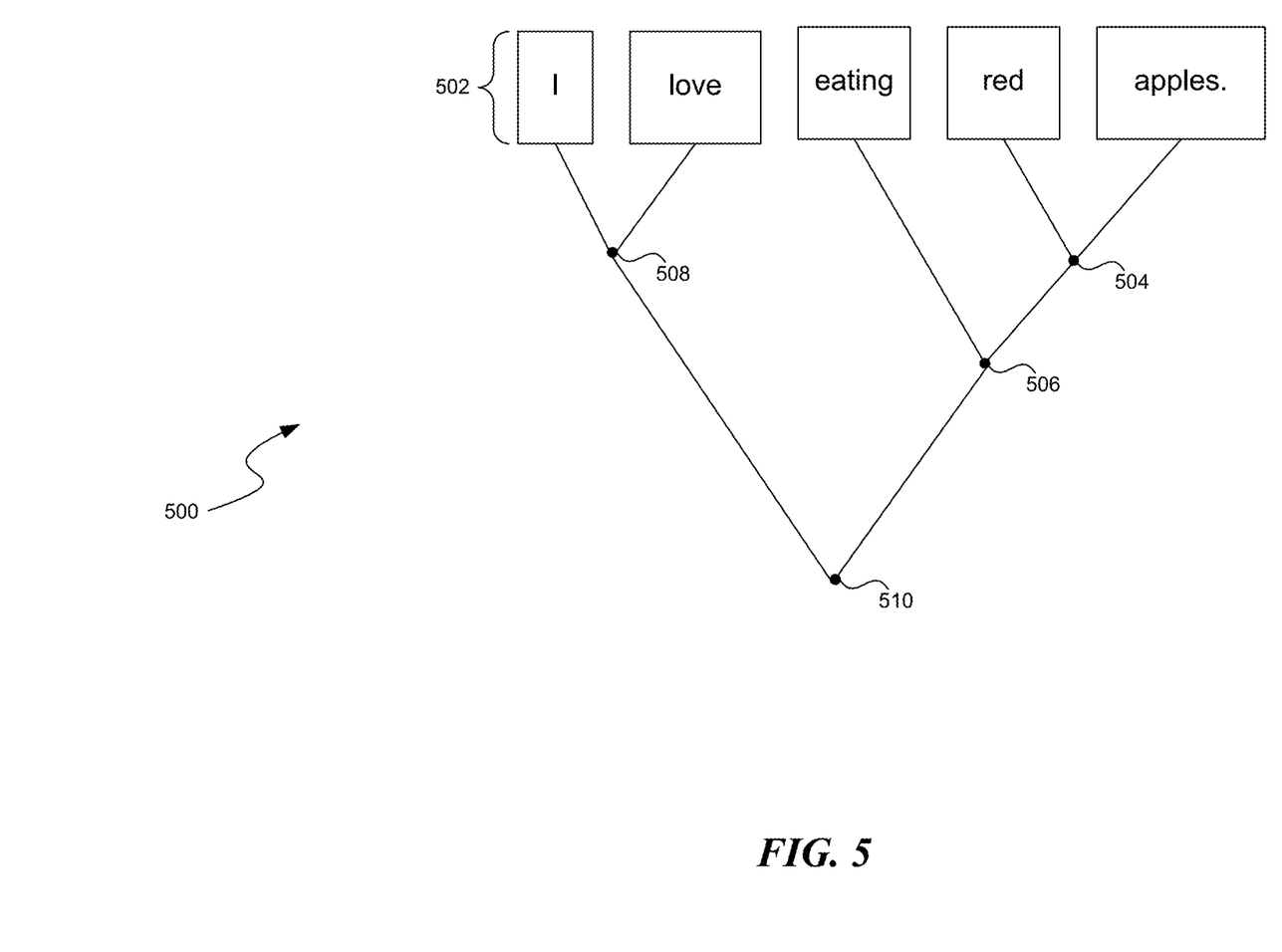
FIG. 5 is an example illustrating building a dependency structure for a selected language snippet.

FIG. 5 is an example 500 illustrating building a dependency structure for a selected language snippet: "I love eating red apples." Example 500 begins by dividing the language snippet into word groups, and a leaf node is added to the dependency structure for each word group at level 1, collectively leaf-nodes 502. A relationship of "modifier" is then determined between the word groups "red" and "apples." The highest level of the nodes for "red" and "apples" is level 1, so an intermediate node 504 corresponding to the combination of "red apples" is added at the next highest level, level 2, with edges connected to the parent leaf nodes "red" and "apples."

Next, a relationship of "subject" is determined between the word groups "eating" and "red apples." The highest level of the nodes for "eating" and "red apples" is level 2, so an intermediate node 506 corresponding to the combination of "eating red apples" is added at the next highest level, level 3, with edges connected to the parent nodes "eating" and node 504.

Next, a relationship of "subject" is determined between the word groups "I" and "love." The highest level of the nodes for "I" and "love" is level 1, so an intermediate node 508 corresponding to the combination of "I love" is added at the next highest level, level 2, with edges connected to the parent leaf nodes "I" and "love."

Next, a relationship of "object" is determined between the word groups "I love" and "eating red apples." The highest level of the nodes for "I love" and "eating red apples" is level 3, so a node 510 corresponding to the combination of "I love eating red apples" is added at the next highest level, level 4, with edges connected to the parent nodes node 506 and node 508. Node 510 represents the entire snippet, so node 510 is the root node of the now complete dependency structure.

Figure 6:
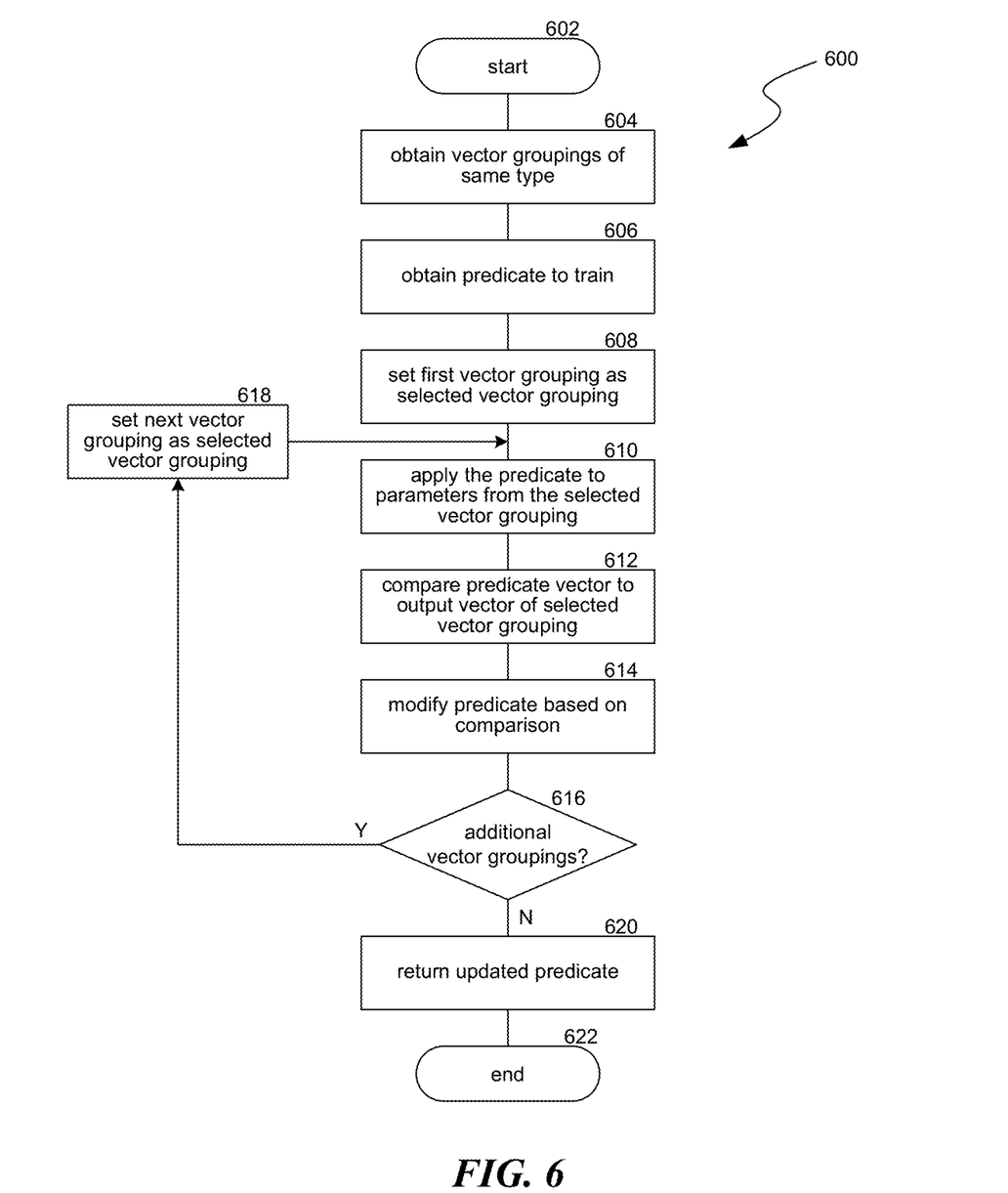
FIG. 6 is a flow diagram illustrating a process used in some implementations for generating a vector space predicate using vector space predicate training data.

FIG. 6 is a flow diagram illustrating a process 600 used in some implementations for generating a vector space predicate using vector space predicate training data. Process 600 begins at block 602 and continues to block 604. At block 604, process 600 can receive one or more vector groupings each comprising an output vector, parameter vectors, and a type indicating a relationship between word groups that the parameter vectors represent. In some implementations, all the received vector groupings have the same type.

At block 606, process 600 can obtain a vector space predicate to train. In some implementations, a vector space predicate can include a machine learning structure, such as a neural network. In some implementations, a vector space predicate can include other vector transformation functions that take two or more input vectors and produce an output vector, and whose parameters can be adjusted based on training data. In some implementations, process 600 can obtain the vector space predicate by generating a new vector space predicate, which in the case of the vector space predicate having a neural network, can include assigning random or neutral values to the nodes of the neural network. In some implementations, process 600 can obtain the vector space predicate by receiving a vector space predicate that has already been partially trained, such as by previous iterations of process 600. In some implementations, the obtained vector space predicate can be associated with a type corresponding to the type of the vector groupings received at block 604.

At block 608, process 600 can set a first of the vector groupings received at block 604 as a selected vector grouping. At block 610, process 600 can apply the parameter vectors from the selected vector grouping to the obtained vector space predicate. This application can cause the vector space predicate to generate a new vector, referred to herein as a "predicate vector." The predicate vector is a representation of what the vector space predicate computes that the combination of the parameter vectors should be, given their relationship type.

At block 612, process 600 can compare the predicate vector generated at block 610 to the output vector of the selected vector grouping. This comparison can result in a difference value. In some implementations, this difference value can be computed as a cosine difference between the predicate and output vectors. At block 614, process 600 can modify the vector space predicate based on the difference value. For example, where the vector space predicate uses a neural network, process 600 can modify the weights of one or more neural network nodes to make the resulting predicate vector more closely match the output vector.

At block 616, process 600 can determine whether there are any additional vector groupings, from the vector groupings received at block 614, that have not been operated on by the loop between blocks 610-618. If so, process 600 continues to block 618, where process 600 can set the next vector grouping of the vector groupings received at block 604 as the selected vector grouping, which will then be operated on by the loop between blocks 610-618. If not, process 600 continues to block 620, where process 600 can return an indication of the updated vector space predicate modified at block 614. This vector space predicate is now further trained to generate output vectors for parameter vectors that have the type specified by the vector groupings received at block 604. Process 600 then continues to block 622, where it ends.

Figure 7:
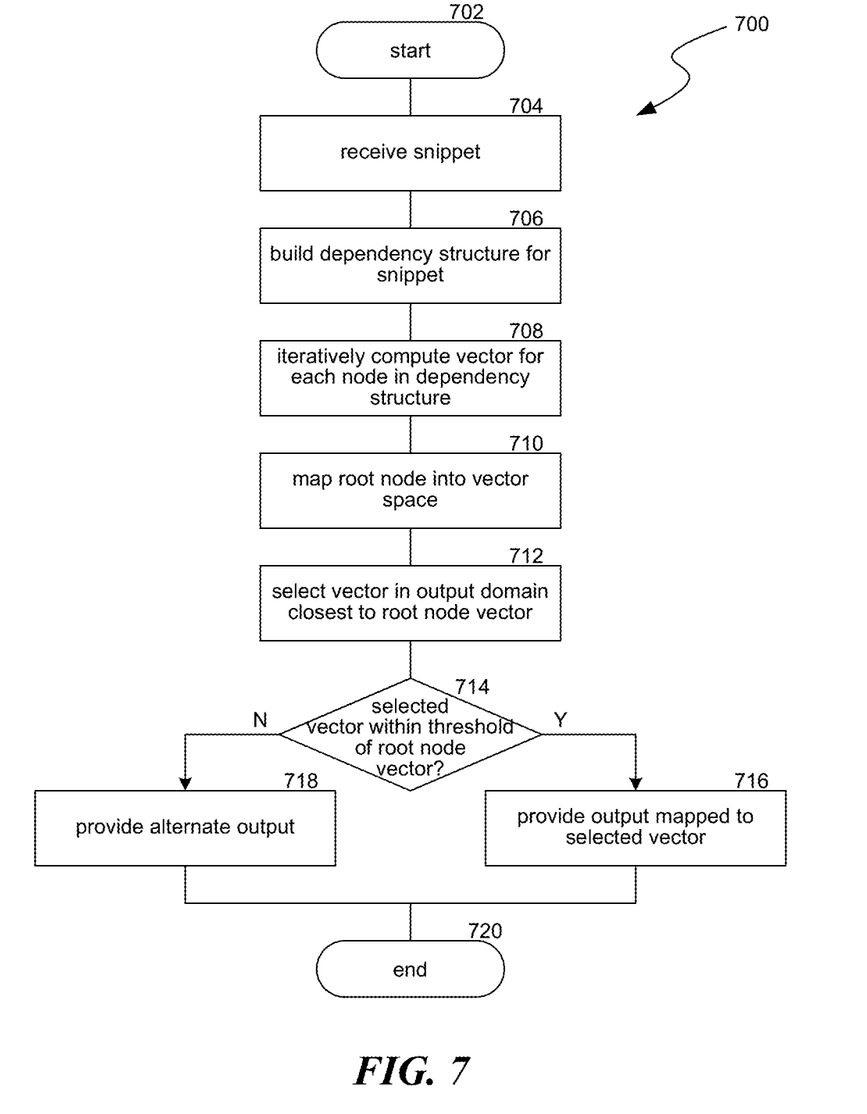
FIG. 7 is a flow diagram illustrating a process used in some implementations for applying vector space predicates and a vector space to obtain a domain transformation of a selected snippet.

FIG. 7 is a flow diagram illustrating a process 700 used in some implementations for applying vector space predicates and a vector space to obtain a domain transformation of a selected snippet. Process 700 begins at block 702 and continues to block 704. At block 704, process 700 can receive a snippet that is to be transformed into a snippet in a different domain, referred to as the "output domain." For example, the output domain can be an alternate language, a corrected version of the language of the received snippet, a response to the received snippet, etc.

At block 706, process 700 can build a dependency structure for the received snippet. Process 700 can build a dependency structure in the same manner discussed above in relation to block 408 of FIG. 4 and the example in FIG. 5.

At block 708, process 700 can apply vector space predicates to compute a vector for each node in the dependency structure built at block 706. Process 700 can accomplish this for each selected leaf node by obtaining pre-defined word or word group vectors. Process 700 can accomplish this for each individual non-leaf node by selecting a vector space predicate corresponding to the type of that individual node and applying the selected vector space predicate to the vectors corresponding to the parent nodes of that individual node. Using vector space predicates to compute a vector for each node in a dependency structure is discussed in greater detail below in relation to FIG. 8.

At block 710, process 700 can map the vector corresponding to the root node of the dependency structure, which is the vector representing the entire snippet received at block 704, into a vector space. A vector space can be a coordinate system common across multiple domains such that vectors corresponding to snippets in multiple domains can be mapped into the same vector space. In some implementations, the vector space can be one that has already had multiple vectors corresponding to other snippets that are in the output domain mapped into the vector space using a process similar to that described above in relation to blocks 704-710.

At block 712, process 700 can select a vector in the vector space that corresponds to a snippet in the output domain. Process 700 can make this selection by selecting a vector that corresponds to a snippet in the output domain that is also closest to the vector mapped into the vector space at block 710. In some implementations, process 700 can use the cosine difference between vectors to make determinations about relative closeness between vectors.

In some implementations, process 700 can make a determination at block 714 of whether a difference between the vector selected at block 712 and the vector mapped into the vector space at block 710 are within a threshold difference of each other. This determination can indicate whether there is a snippet in the output domain that has a vector mapped into the vector space that is a reasonable transformation of the received snippet. If there is a vector that is sufficiently close, process 700 can continue to block 716. If there is not a vector that is sufficiently close, process 700 can continue to block 718. In some implementations, there is not a vector closeness requirement, in which case process 700 proceeds directly from block 712 to block 716. At block 716, process 700 can provide an indication of the snippet corresponding to the vector selected at block 712. This snippet, which is in the output domain, can be used as the transformed version of the snippet received at block 704. Process 700 then continues to block 720.

At block 718, there is not a snippet in the output domain with a vector mapped into the vector space that is sufficiently similar to the vector mapped into the vector space at block 710. In this case, process 700 can use the results of alternate language processing mechanisms to obtain a transformation of the received snippet. For example, where the output domain is an alternate language, process 700 can use the results of another machine translation engine. As another example, where the output domain is a correction, process 700 can use the results of a spelling or grammar correction engine. In some implementations, these results can be generated in parallel to the operations performed at blocks 704-714, thereby permitting these results to be more readily available if they are needed. In some implementations, process 700 can use aspects of the processing from blocks 704-712 as part of the alternate language processing mechanisms whose results are used at block 718. For example, ambiguities between multiple possible machine translation results can be resolved by using the possible machine translation result that is most similar to the snippet corresponding to the vector selected at block 712. Process 700 can return an indication of the results determined at block 718. Process 700 then continues to block 720, where it ends. Additional details about applying a vector spaces can be found in U.S. Patent Application titled Language Independent Representations, U.S. patent application Ser. No. 14/878,794, filed on the same day as the instant application, which is hereby incorporated by reference.

Figure 8:
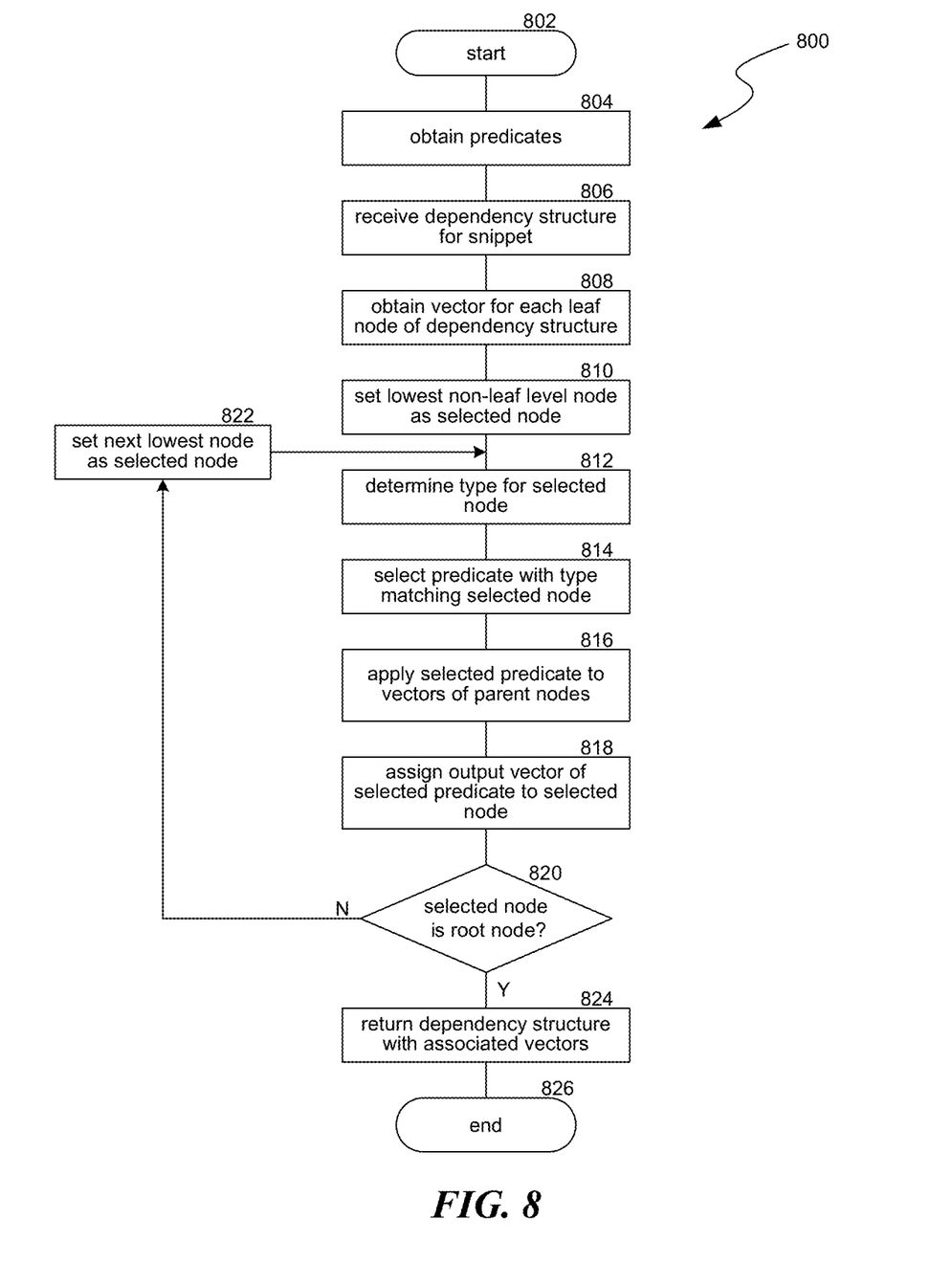
FIG. 8 is a flow diagram illustrating a process used in some implementations for applying vector space predicates to a dependency structure to generate representative vectors.

FIG. 8 is a flow diagram illustrating a process 800 used in some implementations for applying vector space predicates to a dependency structure to generate representative vectors. Process 800 begins at block 802 and continues to block 804. At block 804, process can obtain one or more vector space predicates. In some implementations, these vector space predicates can be built using processes 400 and 600, described above. At block 806, process 800 can receive a dependency structure for a snippet, such as the dependency structure built at block 706 described above.

At block 808, process 800 can obtain a vector for each leaf node of the received dependency structure. In some implementations, this can be performed by retrieving vectors that have been defined for the words or word groups corresponding to each leaf node. In some implementations, this can be performed by determining a modification or combination of vectors defined for words or word groups related to the word or word group corresponding to each leaf node. For example, if a selected leaf node corresponds to the word "queen" and there are predefined vectors for the words "ruler" and "female," the combination of the vectors representing these words can be used as the vector representing the word "queen."

At block 810, process 800 can set a first node at the lowest level of the dependency structure above the leaf level as a selected node. If there are multiple nodes at the same level, they can be selected in any order as long as they have not previously been operate on by the loop between blocks 812-822. At block 812, process 800 can retrieve a type associated with the selected node. As discussed above, this type can be an indication of a relationship between the word groups corresponding to the parent nodes of the selected node. At block 814, process 800 can select a vector space predicate, from the vector space predicates obtained at block 804, that has a type corresponding to the type retrieved at block 812.

At block 816, the vector space predicate is applied to vectors associated with the parent nodes of the selected node. As discussed above, a vector space predicate can include a trained neural network or other transformation function that, when the vector space predicate is applied, can take two or more vectors and provide an output vector. At block 818, process 800 can assign the output vector computed at block 816 to the selected node.

At block 820, process 800 determines whether the selected node is the root node of the dependency structure, which would mean that a vector has been computed for all the nodes of the dependency structure. If so, process 800 can continue to block 824. If not, process 800 can continue to block 822.

At block 822, process 800 can set a next node of the dependency structure as the selected node to be operated on by the loop between blocks 812-822. Process 800 can select this next node as another node at the same level as the previous selected node that has not been operated on by the loop between blocks 812-822. If there are no more nodes at the same level as the previous selected node that have also not been operated on by the loop between blocks 812-822, process 800 can select this next node as any node in the level that is one level above the level of the previous selected node. Once the loop between blocks 812-822 has operated on all the blocks in the dependency structure, process 800 can continue to block 822.

At block 822, process 800 can return an indication of the dependency structure with a vector associated with each node. Process 800 can then continue to block 826, where it ends.

Several implementations of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C, etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A system for semantically transforming a snippet into an alternate domain comprising:
    a memory;
    one or more processors;
    an interface configured to receive the snippet;
    a dependency structure building module configured to build a dependency structure for the snippet comprising multiple nodes, the multiple nodes comprising at least one leaf node, at least one intermediate node, and a root node;
    a predicate applying module configured to, for each selected non-leaf node of one or more of the multiple nodes including at least the root node, compute a vector based on one or more nodes at a level lower than the selected non-leaf node; and
    a vector space build and compare module configured to:
        map the computed vector for the root node into a vector space;
        determine a matching vector previously mapped into the vector space that is in the alternate domain and that is closest to the computed vector for the root node mapped into the vector space; and
        select an output snippet in the alternate domain that corresponds to the matching vector;
    wherein the interface is further configured to provide an indication of the output snippet.

2. The system of claim 1,
    wherein each selected non-leaf node of one or more of the multiple nodes of the dependency structure is associated with a type; and
    wherein the type determined is based on a relationship between word groups associated with two or more parent nodes of the selected non-leaf node.

3. The system of claim 2, wherein the predicate applying module is configured to, for each selected non-leaf node of one or more of the multiple nodes,
    compute the vector based on the one or more nodes the level lower than the selected non-leaf node by:
        selecting a vector space predicate with a vector space predicate type corresponding to the type determined for the selected non-leaf node; and
        applying the selected vector space predicate to the vectors corresponding to the two or more parent nodes of the selected non-leaf node.

4. The system of claim 1, further comprising a vector space building module configured to:
    compute vectors representing snippets in the alternate domain; and
    map the vectors representing snippets in the alternate domain into the vector space;
    wherein the matching vector previously mapped into the vector space is one of the vectors representing snippets in the alternate domain.

5. The system of claim 1, wherein:
    the interface is further configured to receive a second snippet;
    the dependency structure building module is further configured to build a second dependency structure for the second snippet;
    the predicate applying module is further configured to compute a second vector for a second root node of the second dependency structure; and
    the vector space build and compare module is further configured to:
        map the computed second vector into the vector space;
        determine a second matching vector previously mapped into the vector space that is in the alternate domain and that is closest to the computed second vector;
        compare the second matching vector to the computed second vector to determine a difference;
        determining that the difference is above a threshold value;
        based on the determining that the difference is above the threshold value, using output from an alternate form of machine translation on the second snippet to obtain a second output snippet; and
    the interface is further configured to provide an indication of the second output snippet.

6. The system of claim 1, wherein the at least one leaf node is at a lowest level, the at least one intermediate node is at a level above the lowest level, and the root node is at a highest level.

7. The system of claim 1, wherein the snippet is in a domain of a particular natural language and the alternate domain is a domain of a natural language other than the particular natural language.

8. A computer-implemented method for semantically transforming a snippet into an alternate domain comprising:
    receiving the snippet;
    building a dependency structure for the snippet comprising multiple nodes, the multiple nodes comprising at least one leaf node, at least one intermediate node, and a root node;
    for each selected non-leaf node of one or more of the multiple nodes including at least the root node, computing a vector based on one or more nodes at a level lower than the selected non-leaf node;
    mapping the computed vector for the root node into a vector space;
    determining a matching vector previously mapped into the vector space that is in the alternate domain and that is closest to the computed vector for the root node mapped into the vector space;

selecting an output snippet in the alternate domain that corresponds to the matching vector; and providing an indication of the output snippet.

9. The method of claim 8,
wherein each selected non-leaf node of one or more of the multiple nodes of the dependency structure is associated with a type; and
wherein the type determined is based on a relationship between word groups associated with two or more parent nodes of the selected non-leaf node.

10. The method of claim 9, further comprising:
for each selected non-leaf node of one or more of the multiple nodes:
  computing the vector based on the one or more nodes the level lower than the selected non-leaf node by:
  selecting a vector space predicate with a vector space predicate type corresponding to the type determined for the selected non-leaf node; and
  applying the selected vector space predicate to the vectors corresponding to the two or more parent nodes of the selected non-leaf node.

11. The method of claim 8, further comprising:
computing vectors representing snippets in the alternate domain; and
mapping the vectors representing snippets in the alternate domain into the vector space;
wherein the matching vector previously mapped into the vector space is one of the vectors representing snippets in the alternate domain.

12. The method of claim 8, further comprising:
receiving a second snippet;
building a second dependency structure for the second snippet;
computing a second vector for a second root node of the second dependency structure;
mapping the computed second vector into the vector space;
determining a second matching vector previously mapped into the vector space that is in the alternate domain and that is closest to the computed second vector;
comparing the second matching vector to the computed second vector to determine a difference;
determining that the difference is above a threshold value;
obtaining a second output snippet based on the determining that the difference is above the threshold value, using output from an alternate form of machine translation on the second snippet; and
providing an indication of the second output snippet.

13. The method of claim 8, wherein the at least one leaf node is at a lowest level, the at least one intermediate node is at a level above the lowest level, and the root node is at a highest level.

14. The method of claim 8, wherein the snippet is in a domain of a particular natural language and the alternate domain is a domain of a natural language other than the particular natural language.

15. A non-transitory, computer-readable storage medium containing instructions that, when executed by a processor, semantically transform a snippet into an alternate domain by causing the processor to:
receive the snippet;
build a dependency structure for the snippet comprising multiple nodes, the multiple nodes comprising at least one leaf node, at least one intermediate node, and a root node;
for each selected non-leaf node of one or more of the multiple nodes including at least the root node, compute a vector based on one or more nodes at a level lower than the selected non-leaf node;
map the computed vector for the root node into a vector space;
determine a matching vector previously mapped into the vector space that is in the alternate domain and that is closest to the computed vector for the root node mapped into the vector space;
select an output snippet in the alternate domain that corresponds to the matching vector; and
provide an indication of the output snippet.

16. The medium of claim 15,
wherein each selected non-leaf node of one or more of the multiple nodes of the dependency structure is associated with a type; and
wherein the type determined is based on a relationship between word groups associated with two or more parent nodes of the selected non-leaf node.

17. The medium of claim 16, the instructions further causing the processor to:
for each selected non-leaf node of one or more of the multiple nodes:
  compute the vector based on the one or more nodes the level lower than the selected non-leaf node by:
  select a vector space predicate with a vector space predicate type corresponding to the type determined for the selected non-leaf node; and
  apply the selected vector space predicate to the vectors corresponding to the two or more parent nodes of the selected non-leaf node.

18. The medium of claim 15, the instructions further causing the processor to:
compute vectors representing snippets in the alternate domain; and
map the vectors representing snippets in the alternate domain into the vector space;
wherein the matching vector previously mapped into the vector space is one of the vectors representing snippets in the alternate domain.

19. The medium of claim 15, the instructions further causing the processor to:
receive a second snippet;
build a second dependency structure for the second snippet;
compute a second vector for a second root node of the second dependency structure;
map the computed second vector into the vector space;
determine a second matching vector previously mapped into the vector space that is in the alternate domain and that is closest to the computed second vector;
compare the second matching vector to the computed second vector to determine a difference;
determine that the difference is above a threshold value;
obtain a second output snippet based on the determining that the difference is above the threshold value, using output from an alternate form of machine translation on the second snippet; and
provide an indication of the second output snippet.

20. The medium of claim 15,
wherein the at least one leaf node is at a lowest level, the at least one intermediate node is at a level above the lowest level, and the root node is at a highest level; and
wherein the snippet is in a domain of a particular natural language and the alternate domain is a domain of a natural language other than the particular natural language.

* * * * *